US010448432B1

(12) United States Patent
Chu et al.

(10) Patent No.: US 10,448,432 B1
(45) Date of Patent: Oct. 15, 2019

(54) FREQUENCY DOMAIN PRACH FILTER FOR PRACH SIGNAL RECOVERY

(71) Applicant: Hong Kong Applied Science and Technology Research Institute Co., Ltd., Shatin, New Territories (HK)

(72) Inventors: Yijing Chu, Hong Kong (CN); Yuxian Zhang, Hong Kong (CN); Man Wai Kwan, Shatin (HK); Eric Kong Chau Tsang, Kln (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 16/005,306

(22) Filed: Jun. 11, 2018

(51) Int. Cl.
*H04W 74/08* (2009.01)
*H04L 27/26* (2006.01)
*H04L 5/00* (2006.01)

(52) U.S. Cl.
CPC ....... *H04W 74/0833* (2013.01); *H04L 5/0048* (2013.01); *H04L 27/265* (2013.01)

(58) Field of Classification Search
CPC ........... H04W 74/0833; H04W 72/042; H04W 72/0446; H04L 27/2602; H04L 5/0007
See application file for complete search history.

(56) References Cited

U.S. PATENT DOCUMENTS

| | | | |
|---|---|---|---|
| 10,110,405 B2 * | 10/2018 | Wang | ................ H04W 74/0833 |
| 2008/0310561 A1 | 12/2008 | Song et al. | |
| 2013/0223241 A1 | 8/2013 | Zhang et al. | |

FOREIGN PATENT DOCUMENTS

| | | |
|---|---|---|
| CN | 102869027 A | 1/2013 |
| CN | 103379071 A | 10/2013 |
| CN | 103503343 A | 1/2014 |
| CN | 106792867 A | 5/2017 |

OTHER PUBLICATIONS

International Search Report and Written Opinion issued for PCT/CN2018/091334, dated Mar. 7, 2019, 9 pages.

* cited by examiner

*Primary Examiner* — Chandrahas B Patel
(74) *Attorney, Agent, or Firm* — Norton Rose Fulbright US LLP (57) ABSTRACT

Systems and methods which provide for detection of a signal using resource elements in the frequency domain where the signal for which detection is provided is multiplexed with other signals having subcarrier spacing that is different than the signal for which detection is provided are disclosed. Embodiments may provide for detection of a physical random access channel (PRACH) signal in a cellular radio communication system using resource elements in the frequency domain, wherein the PRACH signal is multiplexed with signals of other channels (e.g., data and/or control channel signals) of the cellular radio communication system. A frequency domain filter, such as implementing inverse discrete Fourier transform (IDFT) with down-sampling using indices for PRACH recovery, may be utilized to extract PRACH samples from frequency domain resource elements provided in a resource grid corresponding to a different subcarrier spacing than that of the PRACH.

32 Claims, 10 Drawing Sheets

FREQUENCY DOMAIN PRACH FILTER FOR PRACH SIGNAL RECOVERY

TECHNICAL FIELD

The present invention relates generally to physical random access channel (PRACH) signal detection and, more specifically, to facilitating PRACH signal detection using resource elements in the frequency domain.

BACKGROUND OF THE INVENTION

In operation according to various wireless networks, the radio network implements control with respect to the terminals. For example, in many cellular radio communication systems (e.g., systems of long term evolution (LTE) networks, also referred to as 3GPP LTE networks, and $5^{th}$ Generation (5G) or new radio (NR) networks, also referred to as 3GPP NR networks) uplink transmission parameters such as frequency, timing, and power are regulated via downlink control signaling from the base station (e.g., enhanced node B (eNB) or next generation node B (gNB)) to the terminal (e.g., user equipment (UE)).

Figure 1:
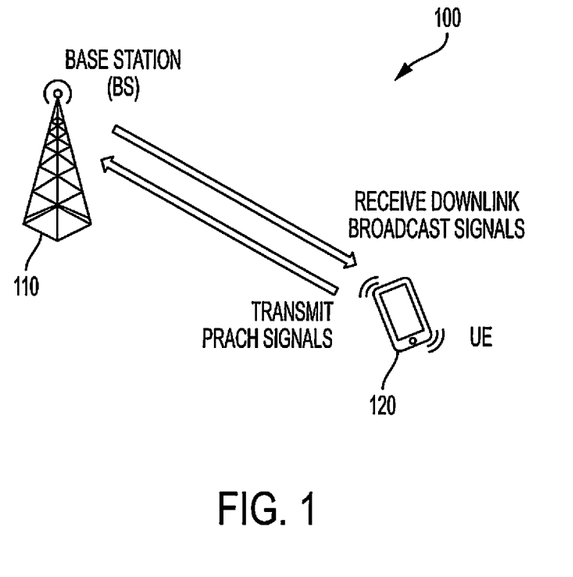
FIG. 1 shows a wireless communication network as may be configured to provide for detection of a signal using resource elements in the frequency domain in accordance with embodiments of the present invention.

A random access procedure, implemented using a physical random access channel (PRACH), may be used in cellular radio communication systems such as LTE and 5G/NR networks for a UE to initiate a connection with a base station. In such a random access procedure, as shown in wireless communication network 100 illustrated in FIG. 1, a UE (e.g., UE 120) may receive downlink signals providing various communication parameters, such as may include synchronization signals (e.g., primary synchronization signal (PSS) and secondary synchronization signal (SSS)), downlink and uplink carrier configuration information (e.g., master information block (MIB)), downlink control information (DCI), and initial access parameters (e.g., system information block (SIB)) broadcast by a base station (e.g., base station 110). Thereafter, the UE may select a random access preamble (e.g., a preamble with a specific bit sequence that has good auto-correlation properties) and transmit the preamble on a PRACH (i.e., transmit a PRACH signal) for detection by the base station and subsequent assignment of communication resources to the UE, such as via the physical downlink control channel (PDCCH).

Figure 2:
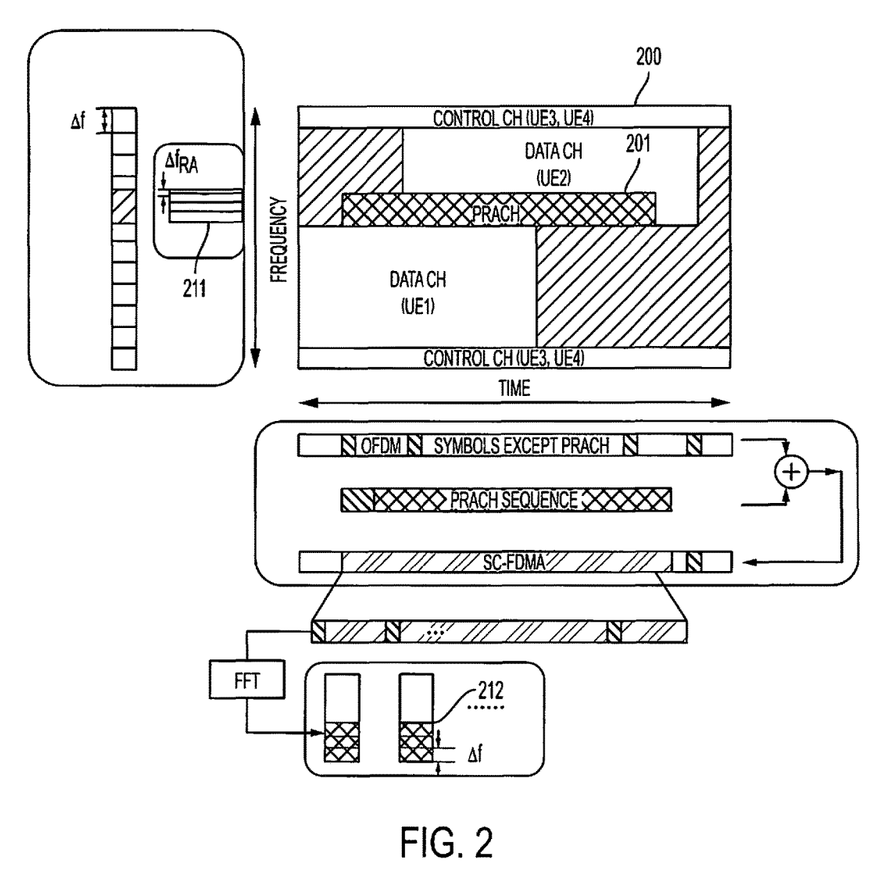
FIG. 2 shows a multiplexed uplink comprising channels having different subcarrier spacing and including a PRACH for which PRACH signal detection may be facilitated in accordance with embodiments of the present invention.

Single-carrier frequency-division multiple access (SC-FDMA) may be implemented by cellular radio communication systems such as LTE and 5G/NR networks, and thus the aforementioned PRACH signal in such implementations is mixed with data and other control signals. For example, as shown in FIG. 2, PRACH 201 may be mixed with control channels and/or data channels of various UEs operating in the wireless network in multiplexed uplink 200. It should be appreciated from the illustration of multiplexed uplink 200 in FIG. 2 that in the frequency domain the PRACH is multiplexed with other channels occupying different frequency bands, whereas in the time domain the SC-FDMA signal comprises a mixture of orthogonal frequency division multiplexing (OFDM) symbols for PRACH and other channels.

In PRACH configurations implemented by cellular radio communication system such as LTE and 5G/NR networks, different subcarrier spacing may be utilized with respect to the PRACH and other channels multiplexed in the uplink. For example, as illustrated in FIG. 2, PRACH 201 may utilize different (e.g., smaller) subcarrier spacing than other channels (e.g., data and/or control channels) of multiplexed uplink 200, whereby resource grid 211 (e.g., 864×1 fre-

2 quency domain resource grid for the PRACH signal) of PRACH 201 differs from resource grid 212 (e.g., 72×12 frequency domain resource grid for the data and/or control channel signals) of the other channels.

It can be appreciated that, in the random access operation described above, the base station needs to operate to detect the PRACH signal from the UE. In particular, the PRACH signal should not only be detected by the base station with high confidence, but may be used for propagation delay estimation once detected and thus should be detected with accurate timing estimation. However, due to the different subcarrier spacing of the PRACH and other channels of the multiplexed uplink, wherein the resource grid of the PRACH differs from the resource grid of the other channels, extraction of PRACH signals from the multiplexed uplink presents challenges.

In light of differences between the PRACH and other channels of the multiplexed uplink (e.g., the aforementioned different subcarrier spacing and corresponding different resource grids), a conventional uplink receiver block may include an uplink data receiver chain for extracting the data of control channels and data channels of the multiplexed uplink and an uplink PRACH receiver chain for extracting the PRACH signal of the multiplexed uplink. For example, an uplink receiver block of a base station of cellular radio communication system such as LTE and 5G/NR networks typically includes an uplink data receiver chain and an uplink PRACH receiver chain.

Figure 3:
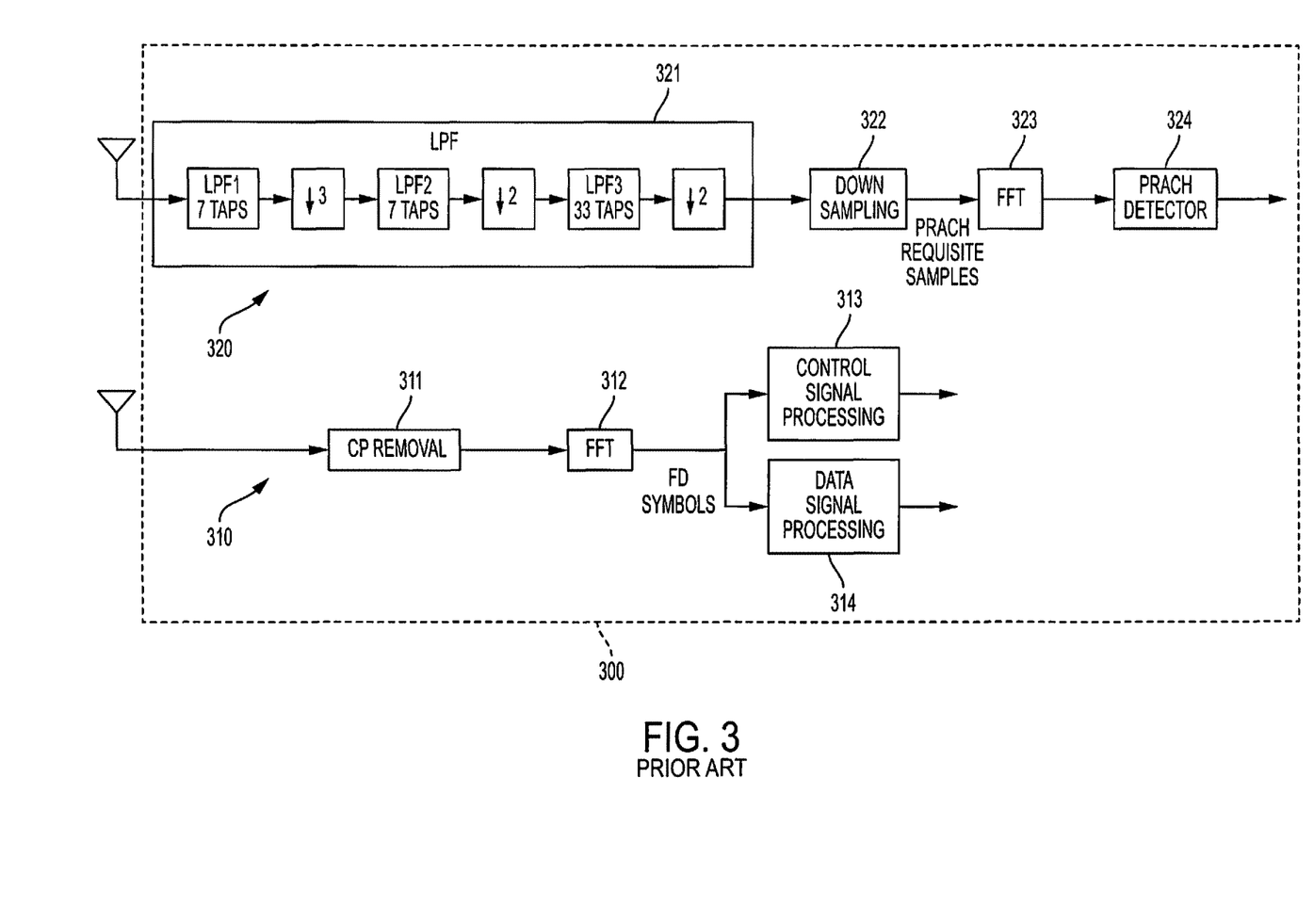
FIG. 3 shows a typical configuration of uplink receiver block.

In uplink receiver block 300 of FIG. 3, implementing a typical configuration of uplink receiver block, it can be seen that the PRACH and other channels of the multiplexed uplink are processed separately. Uplink data receiver chain 310 is provided for extracting data (e.g., from data and/or control channels) from the multiplexed uplink. Accordingly, uplink data receiver chain 310 of FIG. 3 includes cyclic prefix (CP) removal circuit 311 for removal of cyclic prefix symbols from the received uplink signal, fast Fourier transform (FFT) circuit 312 for transforming the time domain uplink signal (except CP) to the frequency domain having the subcarrier spacing of the data and control channels (i.e., resource grid 212), and control signal processing circuit 313 and data signal processing circuit 314 for extracting the control data and payload data, respectively, from channels of the multiplexed uplink.

Uplink PRACH receiver chain 320 of uplink receiver block 300 of FIG. 3 is provided for extracting PRACH signals from the multiplexed uplink. It should be appreciated that a PRACH filter is generally needed to facilitate extracting PRACH signals from the mixture of signals in the multiplexed uplink. A combination of low pass filter (LPF) and down sampling is traditionally used with respect to time domain signals by the base station to restore the PRACH signal. A typical implementation of a PRACH filter providing time domain filtering of the PRACH signal using a combination of LPF and down sampling is shown in uplink PRACH receiver chain 320 illustrated in FIG. 3. Uplink PRACH receiver chain 320 of FIG. 3 includes low pass filter (LPF) circuit 321 for isolating the PRACH from other channels of the multiplexed uplink, down sampling circuit 322 for reducing the sampling rate of the PRACH signal (e.g., to reduce the size of FFT subsequently utilized) to provide PRACH requisite samples for PRACH signal detection, FFT circuit 323 for transforming the PRACH requisite samples to the frequency domain having the subcarrier spacing of the PRACH (i.e., resource grid 211), and PRACH detection circuit 324 for detecting the PRACH signal in the PRACH. It should be appreciated that, although LPF circuit 321 and down sampling circuit 322 are shown separately in the illustration of FIG. 3, these circuits, or a portion thereof, may be combined.

The foregoing PRACH filter is complex and requires significant computational complexity. For example, LPF circuit 321 of uplink PRACH receiver chain 320 processes all the received multiplexed uplink input samples in the raw sampling rate. Thus, significantly more samples than those of the relatively narrow band PRACH signal (e.g., 24576 samples for format 0 at a sampling rate, $f_s$=30.72M) are processed. Moreover, because the PRACH signal bandwidth is very narrow compared to the carrier bandwidth, the PRACH filter of uplink PRACH receiver chain 320 must be very narrow. Accordingly, LPF circuit 321 illustrated in FIG. 3 includes a number of LPF filter instances and down-samplers, wherein the bandwidth of the LPF circuit is determined by $f_s$ and the subcarrier spacing and the down-sampling rate is proportional to $f_s$ (e.g., the down-sampling rate may be as large as 96 in 5G/NR networks). Such LPFs introduce extra delay and increase latency. Further adding to the complexity, different configurations of LPF may be required for accommodating multiple frequency locations for the PRACH signals (e.g., 5G/NR networks may necessitate the use of different LPF designs to accommodate various PRACH signal formats). Thus, although a single instance of LPF circuit 321 is shown in FIG. 3, multiple such LPF circuits may be implemented with respect to any particular base station.

BRIEF SUMMARY OF THE INVENTION

The present invention is directed to systems and methods which provide for detection of a signal using resource elements in the frequency domain where the signal for which detection is provided is multiplexed with other signals having subcarrier spacing that is different than the signal for which detection is provided. For example, embodiments of the invention provide for detection of a PRACH signal in a cellular radio communication system such as LTE and 5G/NR networks using resource elements in the frequency domain, wherein the PRACH signal is multiplexed with signals of other channels (e.g., data and/or control channel signals) of the cellular radio communication system.

In providing for detection of signals using resource elements in the frequency domain, embodiments of the invention implement a relatively low-complexity frequency domain filter. For example, a relatively low-complexity frequency domain filter is utilized to extract samples from frequency domain resource elements provided in a resource grid corresponding to a different subcarrier spacing (e.g., the subcarrier spacing of data and/or control channels multiplexed with the PRACH) than that of the PRACH for recovery of the PRACH signal. Frequency domain PRACH filters implemented according to concepts of the present invention reduce the complexity and shorten processing time for PRACH signal extraction.

Embodiments of a frequency domain PRACH filter may, for example, implement inverse discrete Fourier transform (IDFT) with down-sampling using one or more indices for PRACH recovery. For example, the indices for PRACH recovery utilized according to embodiments comprise sample indices (also referred to herein as "sample indices within the OFDM symbols") to indicate samples within the frequency domain OFDM symbols provided in the resource grid of data and/or control channels multiplexed with the PRACH for PRACH signal recovery. The indices for PRACH recovery utilized according to embodiments may further comprise requisite sample indices utilized for mapping PRACH data recovered from frequency domain OFDM symbols provided in the resource grid of data and/or control channels multiplexed with the PRACH to PRACH requisite samples. Such indices for PRACH recovery are generated (e.g., a priori) according to embodiments for the particular PRACH format of a PRACH signal being detected.

A frequency domain PRACH filter of embodiments may operate to utilize the aforementioned sample indices within the OFDM symbols to recover PRACH signal data (e.g., using IDFT computations) from the OFDM symbols. Thereafter, the frequency domain PRACH filter may operate to map the recovered PRACH data to a PRACH requisite sample using the aforementioned requisite sample indices. The resulting PRACH requisite sample output by a frequency domain PRACH filter of embodiments of the invention may be utilized to recover the PRACH signal (e.g., using FFT computations).

In operation according to embodiments, an uplink receiver chain of a base station implements processing of a received multiplexed signal to provide CP removal and FFT providing output of OFDM symbols in the resource grid of data and/or control channels multiplexed with the PRACH. A frequency domain PRACH filter implementing inverse discrete Fourier transform (IDFT) with down-sampling in accordance with concepts herein may thereafter be utilized to recover PRACH data from the OFDM symbols and provide PRACH requisite samples for PRACH signal detection (e.g., using FFT for transforming the PRACH signal to the frequency domain having the subcarrier spacing of the PRACH, and PRACH detection for detecting the PRACH signal in the PRACH). Accordingly, systems and methods implementing a frequency domain PRACH filter of embodiments of the present invention restore the PRACH signal from the resource elements in the frequency domain without using a LPF of the traditional uplink PRACH receiver chain.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Embodiments of the present invention are configured to provide for detection of a signal using resource elements in the frequency domain where the signal for which detection is provided is multiplexed with other signals having subcarrier spacing that is different than the signal for which detection is provided. To aid in understanding the concepts herein, examples are described with reference to recovery of PRACH signals multiplexed with data and/or control channels having different subcarrier spacing than the PRACH, such as may be present in a cellular radio communication system such as LTE and 5G/NR networks. It should be appreciated, however, that concepts of the present invention may be applied with respect to the recovery of other signals.

Figure 4A:
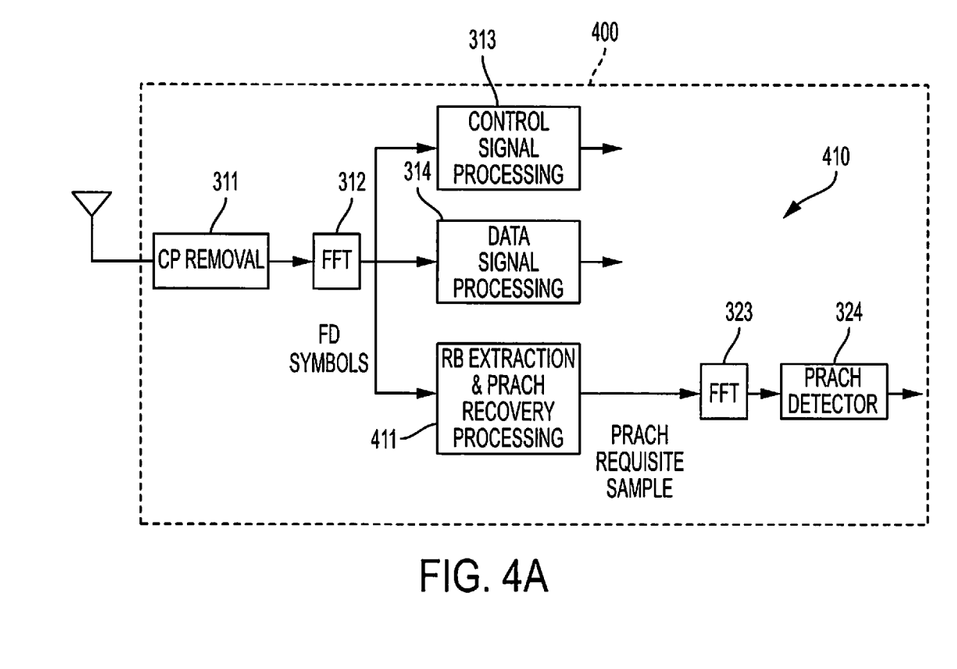
FIG. 4A shows an uplink receiver block configured in accordance with concepts of the present invention.

FIG. 4A shows an exemplary embodiment configured to facilitate PRACH signal recovery using resource elements in the frequency domain. In particular, FIG. 4A shows uplink receiver block 400 comprising uplink receiver chain 410 configured in accordance with concepts of the present invention. Uplink receiver block 400 may, for example, comprise an uplink receiver block of a base station (e.g., base station 110) operable to receive a multiplexed uplink signal from one or more terminals (e.g., one or more of UE 120) and configured to provide for detection of a PRACH signal using frequency domain resource elements in accordance with concepts herein.

In the embodiment illustrated in FIG. 4A, uplink receiver chain 410 is configured for extracting data (e.g., from data and/or control channels) from the multiplexed uplink. Accordingly, uplink receiver chain 410 includes CP removal circuit 311 for removal of cyclic prefix symbols from the received uplink signal, FFT circuit 312 for transforming the time domain uplink signal (except CP) to frequency domain OFDM symbols having the subcarrier spacing of the data and control channels (i.e., resource grid 212), and control signal processing circuit 313 and data signal processing circuit 314 for extracting the control data and payload data, respectively, from the OFDM symbols of channels of the multiplexed uplink, similar to uplink data receiver chain 310 of FIG. 3.

Uplink receiver chain 410 of FIG. 4A, however, is also configured for extracting PRACH signals from the multiplexed uplink. Accordingly, uplink receiver chain 410 of the illustrated embodiment comprises resource block (RB) extraction and PRACH recovery processing circuit 411 configured to extract RBs comprising PRACH signals and recover PRACH data from frequency domain resource elements provided in a resource grid (e.g., resource grid 212) of the subcarrier spacing of data and/or control channels multiplexed with the PRACH (i.e., a resource grid different than that of the PRACH). RB extraction and PRACH recovery processing circuit 411 of embodiments processes frequency domain OFDM symbols and provides PRACH requisite samples for PRACH signal recovery. Consistent with the foregoing, uplink receiver chain 410 of FIG. 4A includes FFT circuit 323 for transforming the PRACH requisite samples to the frequency domain having the subcarrier spacing of the PRACH (e.g., resource grid 211), and PRACH detection circuit 324 for detecting the PRACH signal in the PRACH, similar to uplink PRACH receiver chain 320 of FIG. 3.

It should be appreciated that the functional blocks, and components thereof, of uplink receiver chain 410 of embodiments of the present invention may be implemented using processors, electronics devices, hardware devices, electronics components, logical circuits, memories, software codes, firmware codes, etc., or any combination thereof. For example, one or more functional block, or some portion thereof, may be implemented as discrete gate or transistor logic, discrete hardware components, or combinations thereof configured to provide logic for performing the functions described herein. Additionally or alternatively, when implemented in software, one or more of the foregoing functional blocks, or some portion thereof, may comprise code segments operable upon a processor (e.g., a processor of a computer system having computer readable media, such as a semiconductor memory device, a read only memory (ROM), a flash memory, an erasable ROM (EROM), an optical disk, a hard disk, etc., storing instructions which when executed perform functionality of functional blocks described herein) to provide logic for preforming the functions described herein. Processors utilized in implementing such functional blocks may, for example, comprise a general-purpose processor, a digital signal processor (DSP), an application specific integrated circuit (ASIC), a field programmable gate array (FPGA), or combinations thereof.

Figure 4B:
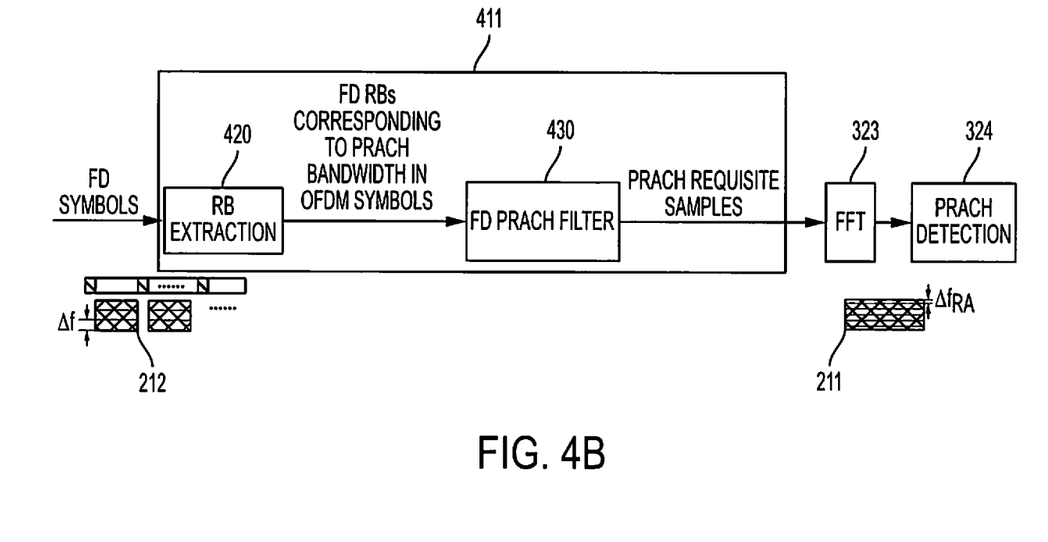
FIG. 4B shows detail with respect to a resource block extraction and PRACH recovery processing circuit of embodiments of an uplink receiver block configured in accordance with concepts of the present invention.

Having generally described RB extraction and PRACH recovery processing circuit 411 of FIG. 4A, reference is now made to FIG. 4B wherein further detail with respect to embodiments of RB extraction and PRACH recovery processing circuit 411 is shown. RB extraction and PRACH recovery processing circuit 411 illustrated in FIG. 4B comprises a frequency domain filter implementation for facilitating detection of signals using resource elements in the frequency domain. In particular, RB extraction and PRACH recovery processing circuit 411 is shown as comprising frequency domain PRACH filter circuit 430 utilized to extract PRACH samples from frequency domain resource elements provided in a resource grid (e.g., resource grid 212) corresponding to a different subcarrier spacing (e.g., the subcarrier spacing of data and/or control channels multiplexed with the PRACH) than the resource grid (e.g., resource grid 211) of the PRACH.

In addition to frequency domain PRACH filter circuit 430, RB extraction and PRACH recovery processing circuit 411 of the illustrated embodiment comprises RB extraction circuit 420. RB extraction circuit 420 may be utilized to extract RBs of the OFDM symbols comprising PRACH signals from the aggregate frequency domain OFDM symbols of the multiplexed uplink output by FFT 312 (FIG. 4A) for use in extracting the PRACH data and reducing the signal input for processing by the frequency domain PRACH filter. For example, RB extraction circuit 420 may operate to extract RBs of the OFDM symbols overlapping with the PRACH sequence. RB extraction circuit 420 of embodiments may, for example, be implemented as logic configured to extract RBs corresponding to the PRACH bandwidth in the OFDM symbols overlapped with the PRACH sequence.

It can be appreciated from the embodiment illustrated in FIG. 4B that RB extraction and PRACH recovery processing circuit 411 implemented in accordance with concepts of the present invention facilitates restoring the PRACH signal from the resource elements in the frequency domain without using a LPF of the traditional uplink PRACH receiver chain (e.g., without LPF 321 of FIG. 3). Accordingly, embodiments of the present invention avoid using complex structures and designs of LPFs for recovery of PRACH signals multiplexed with data and/or control channels having different subcarrier spacing than the PRACH. Operation of RB extraction and PRACH recovery processing circuit 411 of embodiments facilitates restoring time domain PRACH signals directly from the frequency domain resource grid of the multiplexed uplink data and/or control channels. For example, embodiments of the present invention recover PRACH requisite samples in the time domain from subcarriers using the FFT performed for data extraction from other channels of the multiplexed uplink (e.g., an FFT that is provided and utilized for other purposes in the uplink receiver block is essentially utilized to provide low pass filtering with respect to the PRACH signal).

Figure 5:
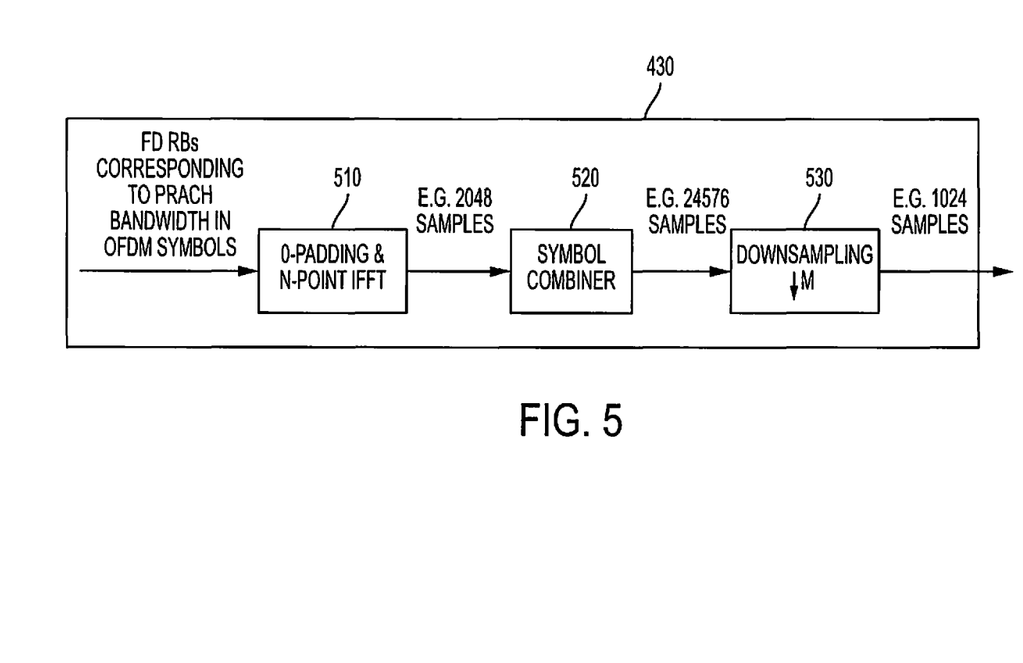
FIG. 5 shows an embodiment of a frequency domain PRACH filter as may be utilized in a resource block extraction and PRACH recovery circuit of embodiments of an uplink receiver block configured in accordance with concepts of the present invention.

A frequency domain PRACH filter as may be utilized by RB extraction and PRACH recovery processing circuit 411 may be implemented as shown in FIG. 5. Frequency domain PRACH filter 430 of the embodiment illustrated in FIG. 5 utilizes zero-padding and N-point inverse fast Fourier transform circuit 510 to extract PRACH time domain signals. Thereafter, frequency domain PRACH filter 430 of the embodiment of FIG. 5 utilizes symbol combiner circuit 520 to combine the time domain samples output by zero-padding and N-point inverse fast Fourier transform (IFFT) circuit 510 and provide time domain PRACH symbols. Down-sampling circuit 530 reduces the sampling rate of the time domain PRACH symbols to provide the PRACH requisite samples from the time domain PRACH samples output by symbol combiner circuit 520 (e.g., to reduce the complexity of FFT 323 used for transforming the PRACH requisite samples to the frequency domain having the subcarrier spacing of the PRACH).

Although the embodiment of frequency domain PRACH filter 430 illustrated in FIG. 5 operates to extract PRACH samples from frequency domain resource elements corresponding to the data and/or control channels of the multiplexed uplink, such an implementation is somewhat computationally inefficient. For example, the zero-padding and IFFT pass an appreciable amount of data in the bandwidth that is not part of the frequency domain signal being extracted and a large IFFT size compared to the number of extracted resource elements (REs) is implemented, which is computationally consuming. Accordingly, embodiments of the present invention may implement a more efficient and low-complexity frequency domain PRACH filter configuration.

Figure 6:
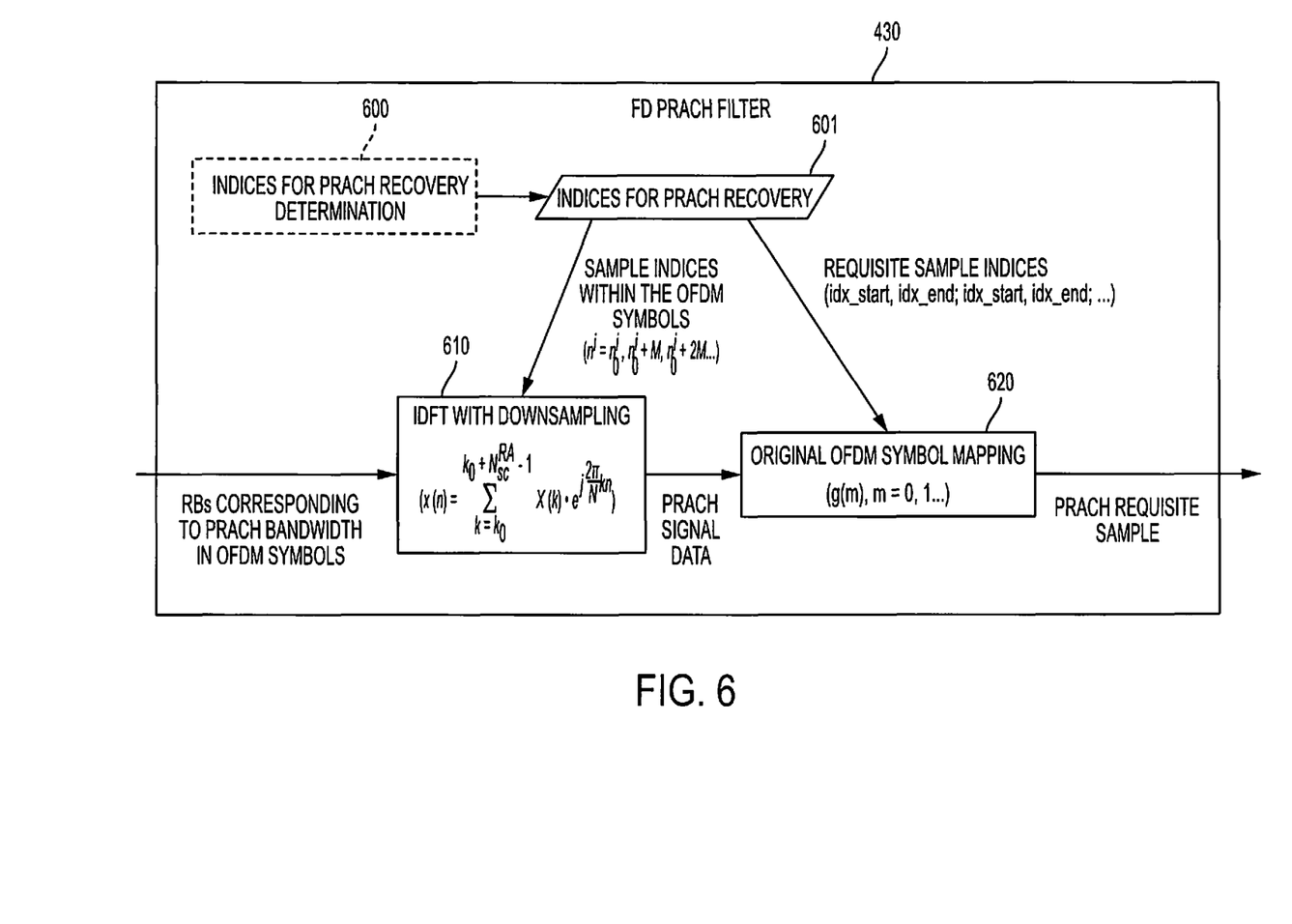
FIG. 6 shows another embodiment of a frequency domain PRACH filter as may be utilized in a resource block extraction and PRACH recovery circuit of embodiments of an uplink receiver block configured in accordance with concepts of the present invention.

An efficient, low-complexity frequency domain PRACH filter configuration as may be utilized by RB extraction and PRACH recovery processing circuit 411 is shown in FIG. 6. Frequency domain PRACH filter 430 of the embodiment illustrated in FIG. 6 comprises IDFT with down-sampling logic 610 configured to implement IDFT with down-sampling computations using sample indices within the OFDM symbols of indices for PRACH recovery 601 to recover PRACH signal data from RBs of frequency domain OFDM symbols provided in the resource grid of data and/or control channels multiplexed with the PRACH. Frequency domain PRACH filter 430 of FIG. 6 further includes OFDM symbol mapping logic 620 configured to implement mapping of the recovered PRACH signal data to PRACH requisite samples using requisite sample indices of indices for PRACH recovery 610.

As can be appreciated from the foregoing, indices for PRACH recovery 610 utilized according to embodiments of the invention may comprise various indices useful for facilitating PRACH signal recovery. In particular, the embodiment of indices for PRACH recovery 601 illustrated in FIG. 6 comprises sample indices within the OFDM symbols for PRACH signal recovery. Indices for PRACH recovery 601 illustrated in FIG. 6 further comprise requisite sample indices utilized for mapping PRACH data recovered from frequency domain OFDM symbols provided in the resource grid of data and/or control channels multiplexed with the PRACH to PRACH requisite samples.

In accordance with embodiments, indices for PRACH recovery 601 are generated according to embodiments for the particular PRACH format of a PRACH signal being detected. One or more indices for PRACH recovery 601 may be generated for a particular PRACH format in real-time operation of frequency domain PRACH filter 430. Additionally or alternatively, one or more indices for PRACH recover 601 may be generated for a particular PRACH format a priori with respect to operation of frequency domain PRACH filter 430. Generation of indices for PRACH recovery 601 may, for example, be generated by a receiver device (e.g. indices for PRACH recovery determination circuit 600 shown as optionally implemented as part of frequency domain PRACH filter 430), a centralized device (e.g., a provisioning server), etc. Further detail regarding generation of indices of indices for PRACH recovery 601 of embodiments of frequency domain PRACH filter 430 in accordance with concepts herein is provided below with reference to FIG. 7A.

Figure 7A:
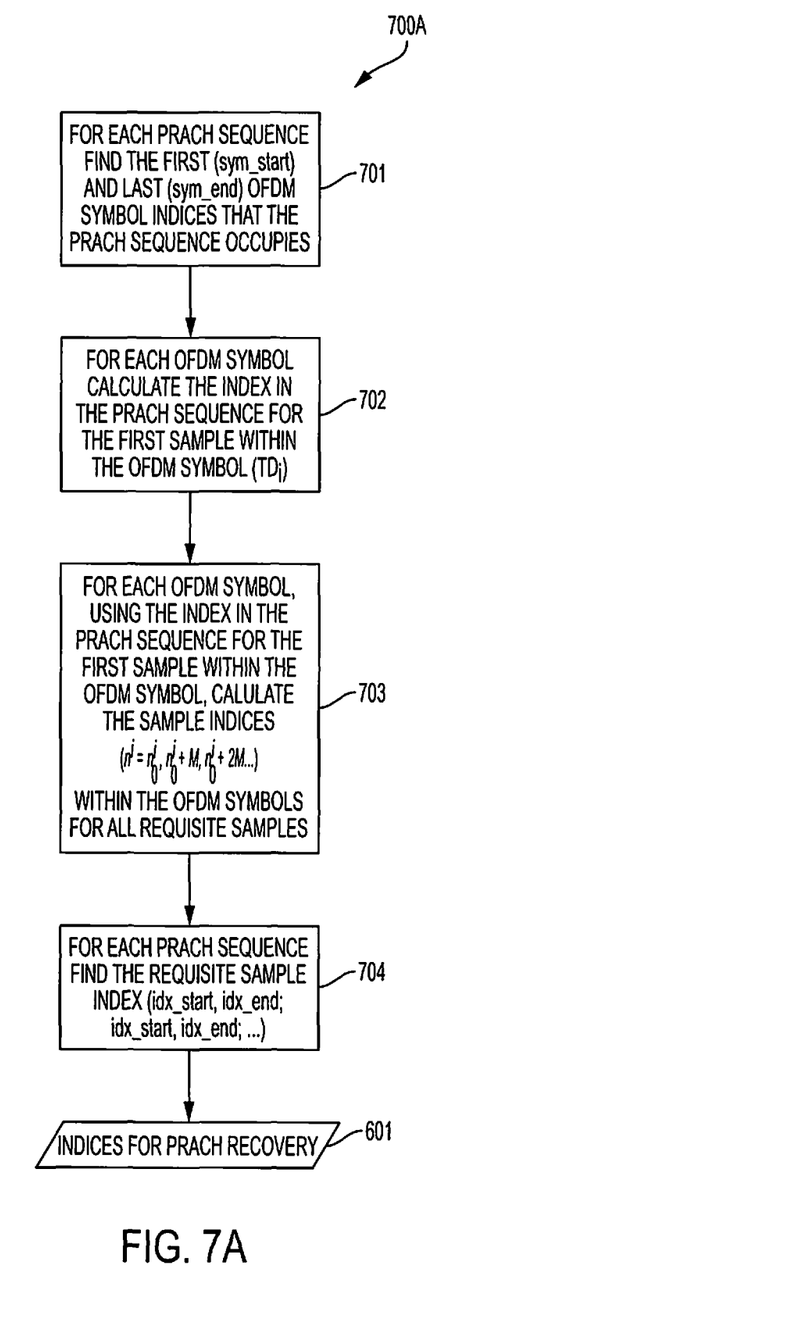
FIG. 7A shows a flow diagram providing operation for generation of indices for PRACH recovery in accordance with embodiments of the present invention.

Referring now to FIG. 7A, flow 700A shows operation for generating sample indices within the OFDM symbols and requisite sample indices of indices for PRACH recovery 601 in accordance with an embodiment of the present invention. It should be appreciated that the functions of flow 700A may be implemented (e.g., a priori to operation with respect to a particular PRACH format for which PRACH signal recovery is to be performed) by logic of frequency domain PRACH filter 430 (e.g., indices for PRACH recovery determination circuit 600), or a host system thereof, and/or by logic of another system (e.g., a provisioning server) to provide indices for PRACH recovery 601 comprising indices for one or more PRACH formats.

Figure 8:
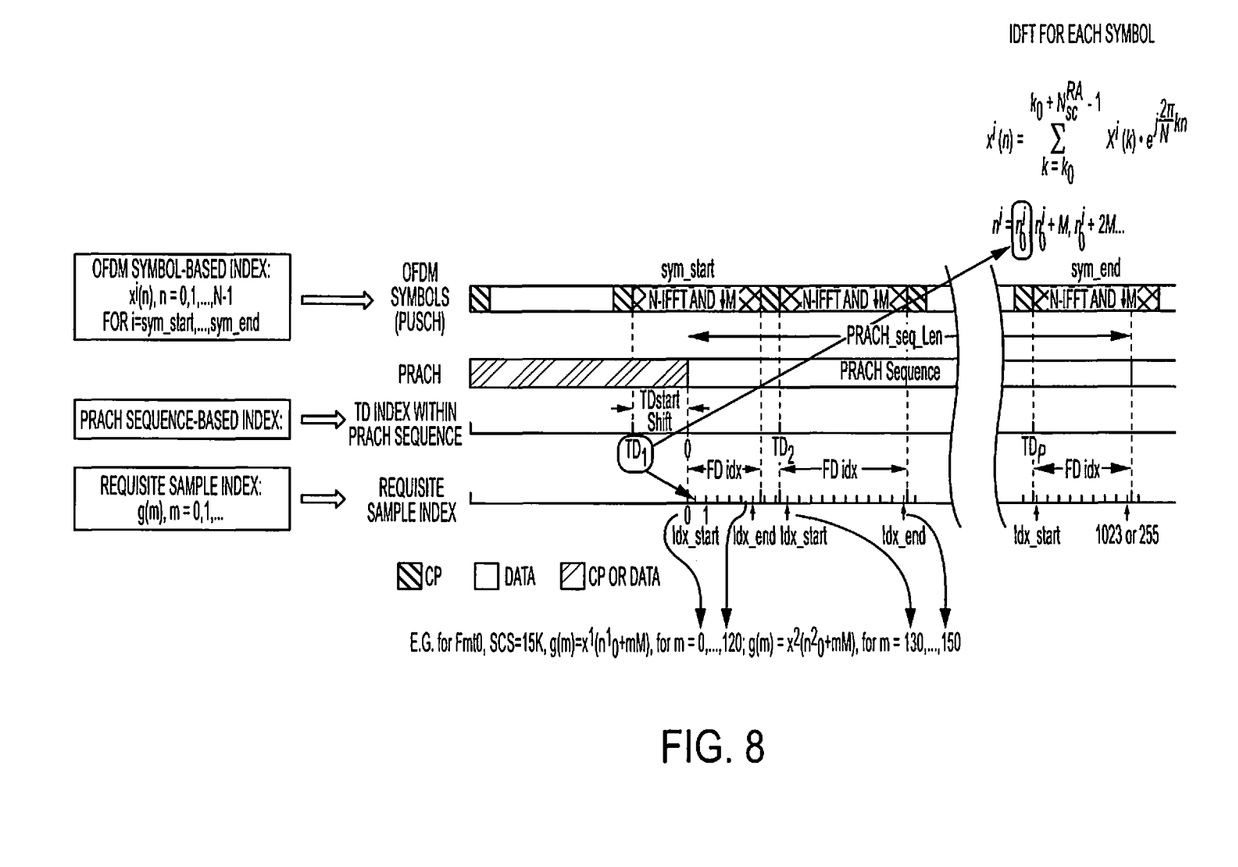
FIG. 8 shows a graphical illustration of indices for PRACH recovery and their use in PRACH requisite sample recovery in accordance with embodiments of the present invention.

In operation of flow 700A of the illustrated embodiment, the first and last OFDM symbol indices that the PRACH sequence occupies are determined at block 701. For example, a start index (sym_start) and an end index (sym_end) for the OFDM symbols overlapping with the PRACH sequence may be determined, as illustrated in the example of FIG. 8. It should be appreciated that the first and last OFDM symbol indices of embodiments identify boundaries in the OFDM symbols in which the PRACH signal data is present.

At block 702 of the embodiment illustrated in FIG. 7A, the index in the PRACH sequence for the first sample within the OFDM symbol is calculated for each OFDM symbol. For example, as illustrated in the example of FIG. 8, a time domain start index ($TD_1, TD_2, \ldots TD_p$) may be determined for each OFDM symbol that contains the PRACH signal. A time domain start shift (TDstartShift) with respect to the first OFDM symbol (e.g., sym_start in FIG. 8) is determined by identifying the overlap of the first OFDM symbol with the PRACH sequence, whereby the time domain start index for the first OFDM symbol is offset by the time domain start shift (i.e., $TD_1$ is offset by TDstartShift).

Continuing with operation according to flow 700A of the illustrated embodiment, at block 703 sample indices within the OFDM symbols are calculated for each OFDM symbol using the index in the PRACH sequence for the first sample for each OFDM symbol calculated in block 702. Embodiments utilize sample indices within the OFDM symbols to provide an indices of the sample points ($n^i = n_0^i$, $n_0^i + M$, $n_0^i + 2M$, ... for the $i^{th}$ OFDM symbol), corresponding to the particular format (e.g., PRACH CP, sequence, subframe, and guard time parameterization) of the PRACH, to appropriately extract time domain samples of the PRACH signal for IDFT processing. The sample indices within the OFDM symbols may, for example, be determined using the index in the PRACH sequence for the first sample for each OFDM symbol ($TD_i$) and a selected down-sampling rate (M), as illustrated in FIG. 8. A down-sampling rate as utilized according to embodiments of the invention may, for example, be proportional to the sampling frequency and inversely proportional to the length of preambles with respect to a particular format.

At block 704 of flow 700A illustrated in FIG. 7A, the requisite sample index is determined for each PRACH sequence. For example, the index in the PRACH sequence for the first sample for each OFDM symbol calculated in block 702 may be utilized to determine an index start (Idx_start) for each OFDM symbol overlapping the PRACH sequence, as shown in FIG. 8. An index end (Idx_end) may additionally or alternatively be determined for each OFDM symbol overlapping the PRACH sequence using the first sample for each OFDM symbol calculated in block 702 and a known symbol length for the OFDM symbols. Accordingly, a requisite sample index (Idx_start, Idx_end; Idx_start, Idx_end; ...) for a particular PRACH sequence may be provided according to embodiments.

In operation according to flow 700A of FIG. 7A, the generated sample indices within the OFDM symbols and requisite sample indices are output as indices for PRACH recovery 601. It should be appreciated that indices for PRACH recovery 601 as output by flow 700A may be provided directly to logic of frequency domain PRACH filter for use in PRACH signal recovery. Additionally or alternatively, indices for PRACH recovery 601 as output by flow 700A may be stored (e.g., in one or more database) for later use by logic of frequency domain PRACH filter for PRACH signal recovery.

It should be appreciated that although the illustrated embodiment of flow 700A has been discussed above with reference to a single PRACH signal format, the functions described may be performed with respect to any number of PRACH signal formats. For example, indices for PRACH recovery for different sampling rates and numerologies used in a cellular radio communication system such as LTE and 5G/NR networks may be computed according to embodiments of the invention, wherein flow 700A of embodiments may be implemented with respect to each PRACH signal format of a plurality of PRACH signal formats for which recovery of PRACH signals is to be facilitated. Accordingly, indices for PRACH recovery 601 of embodiments may comprise indices for use with respect to one or more PRACH signal formats.

Irrespective of the timing and location of computation of indices for PRACH recovery, one or more indices for PRACH recovery are utilized by a frequency domain PRACH filter of embodiments of the invention for facilitating PRACH signal recovery. Accordingly, attention is now directed to FIG. 7B wherein detail with respect to operation of frequency domain PRACH filter 430 of embodiments to extract PRACH signal data from OFDM symbols and provide PRACH requisite samples for PRACH signal recovery is shown. It should be appreciated that the functions of flow 700B, or portions thereof, may be implemented by logic of frequency domain PRACH filter 430, or a host system thereof, and/or by logic of another system (e.g., a provisioning server) to provide PRACH requisite samples in accordance with concepts of the present invention.

As discussed above, RB extraction circuit 420 of embodiments extracts RBs of the OFDM symbols comprising PRACH signals from the aggregate frequency domain OFDM symbols of the multiplexed uplink for providing to frequency division PRACH filter 430. Although reducing the amount of data provided to frequency domain PRACH filter 430, the RBs corresponding to PRACH bandwidth in the OFDM symbols nevertheless includes an appreciable amount of data that is not part of the PRACH signal being extracted. Accordingly, IDFT with down-sampling logic of embodiments is configured to perform IDFT computations only with respect to down-sampled points.

Figure 7B:
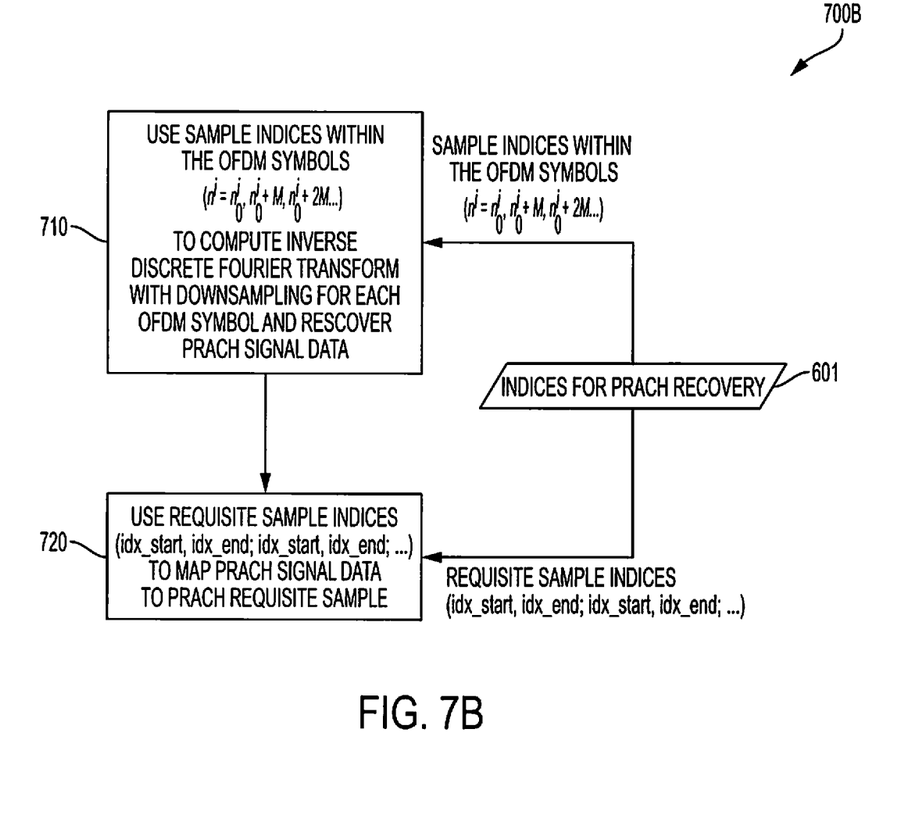
FIG. 7B shows a flow diagram providing operation for recovery of PRACH requisite samples using resource elements in the frequency domain in accordance with embodiments of the present invention.

In accordance with the foregoing, flow 700B of the embodiment illustrated in FIG. 7B performs IDFT computations for the OFDM symbols comprising the PRACH signal using the sample indices within the OFDM symbols of indices for PRACH recovery 601. For example, in operation of IDFT with down-sampling circuit 610 of embodiments, IDFT may be calculated for each OFDM symbol (e.g., $$x^i(n) = \sum_{k=k_0}^{k_0+N_{sc}^{RA}-1} X^i(k) \cdot e^{j\frac{2\pi}{N}kn}$$

for the $i^{th}$ OFDM symbol) only at selected points (i.e., down-sampled points, not all points of the frequency domain symbols provided by FFT 312 and/or RB extraction circuit 420). Accordingly, embodiments of IDFT with down-sampling circuit 610 operating in accordance with block 710 of FIG. 7B utilize sample indices within the OFDM symbols for the particular PRACH format of the PRACH signal to provide indices of the sample points ($(n^i = n_0^i, n_0^i + M, n_0^i + 2M, \ldots$ for the $i^{th}$ OFDM symbol) to appropriately extract time domain samples of the PRACH signal for IDFT processing. For example, IDFT with down-sampling circuit 610 of an embodiment of frequency domain PRACH filter 430 illustrated in FIG. 4 may utilize the OFDM symbol mapping provided by the sample indices within the OFDM symbols to identify the down-sampled points for which IDFT is computed. In operation according to embodiments of IDFT with down-sampling circuit 610, computation of IDFT with down-sampling may be performed in accordance with $$x(n) = \sum_{k=k_0}^{k_0+N_{sc}^{RA}-1} X(k) \cdot e^{j\frac{2\pi}{N}kn},$$

where $k_0$ is the index of the first PRACH subcarrier, $N_{sc}^{RA}$ is the number of PRACH subcarriers, and N is the discrete Fourier transform (DFT) size. The sample indices within the OFDM symbols (e.g., $n=n_0, n_0+M, n_0+2M, \ldots$) identifies the particular points of the OFDM symbols comprising PRACH signals for which IDFT is computed to thereby provide down-sampled PRACH signal data.

It can be appreciated from the foregoing that the IDFT of embodiments only process the requisite (down-sampled) samples. Accordingly, embodiments herein provide for reduced complexity of the PRACH filter since only down-sampled signals are computed. Moreover, embodiments operable in accordance with the configuration of FIG. 6 and the flow of FIG. 7B may process different PRACH symbols in parallel, thereby providing a hardware efficient implementation. Hardware efficiencies are further realized in accordance with concepts herein in light of embodiments operable in accordance with the configuration of FIG. 6 and the flow of FIG. 7B being capable of performing IDFT for different sampling rates, numerologies, and frequency locations for the PRACH signals.

The results of the IDFT with down-sampling computations of block 710, and thus the output of IDFT with down-sampling circuit 610 of embodiments, provides down-sampled PRACH signal data in the time domain. Data of the down-sampled PRACH signal provided according to embodiments needs reordering, due to the CP removal (e.g., operation of CP removal circuit 311), where a certain number of zeros are inserted to replace the lost PRACH data. Such reordering of the down-sampled PRACH signal data may be provided at block 710 of embodiments of the invention.

In operation according to embodiments of the invention, the recovered time domain PRACH signal data is mapped to requisite PRACH samples which are suitable for PRACH signal detection. Accordingly, at block 720 of the illustrated embodiment of flow 700B, the PRACH signal data recovered through operation of IDFT with down-sampling is mapped to PRACH requisite samples using the requisite sample indices of indices for PRACH recovery 601. For example, in operation of OFDM symbol mapping circuit 620 of embodiments, requisite sample indices (Idx_start, Idx_end; Idx_start, Idx_end; ...) for the particular PRACH format of the PRACH signal may be utilized to map the recovered time domain PRACH samples $x^{(i)}(n^{(i)})$ to the PRACH requisite sample g(m), as illustrated in FIG. 8. In operation according to embodiments, the length of PRACH requisite samples is based on a IDFT size (N) and a down-sampling rate (M), and preferably no less than the length of Zadoff-Chu sequence (LRA).

It should be appreciated that the functions of flow 700B, or portions thereof, may be implemented in real-time operation of the frequency domain PRACH filter or a priori to operation with respect to a particular PRACH format for which PRACH signal recovery is to be performed. For example, computations such as computation of IDFT coefficents $$\left(e.g., e^{j\frac{2\pi}{N}kn}\right)$$

may be generated offline (e.g., a priori) with respect to the IDFT computations implemented by a frequency domain PRACH filter with respect to a PRACH signal being detected, such as to reduce latency in the PRACH signal detection by the base station.

The PRACH requisite samples of embodiments are the samples used to derive PRACH frequency signals or do correlation with local Zadoff-Chu sequence. For example, the PRACH requisite samples resulting from the IDFT with down-sampling computations of embodiments may be provided to FFT circuit 323 for transforming the PRACH requisite samples to the frequency domain having the sub-carrier spacing of the PRACH (i.e., resource grid 211). Thereafter, PRACH detection circuit 324 may analyze the frequency domain PRACH signal for detecting the PRACH signal.

As may be seen from the foregoing, embodiments provide for detection of a PRACH signal by using the resource elements from the frequency domain resource grid of the data and/or control channels, thus saving appreciable computation resources. Moreover, in operation according to embodiments, only the requisite (down-sampled) samples are processed by a frequency domain PRACH filter of embodiments, thus further saving computation complexity and benefiting hardware implementation. PRACH extraction and recovery configurations implemented in accordance with the concepts herein facilitate processing sequences/symbols in parallel, thereby decreasing latency. Embodiments of the invention facilitate offline or a priori computation of various parameters, such as indices for mapping for different sampling rates and numerologies to symbols and/or coefficients, to further reduce latency. It should be appreciated that various of the foregoing advantages realized in accordance with embodiments of the invention are particularly well suited to use with respect to 5G/NR networks due to the large PRACH bandwidth vs. system bandwidth ratio in 5G. Embodiments of the invention are nevertheless well suited for application with respect to 4G networks.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for physical random access channel (PRACH) signal recovery, wherein the PRACH signal is received in an uplink signal multiplexed with one or more other channels having a different subcarrier spacing than a subcarrier spacing of the PRACH, the method comprising:
processing the uplink signal and providing frequency domain symbols that are based on the subcarrier spacing of the one or more other channels;
performing frequency domain filtering of resource elements of the frequency domain symbols to recover down-sampled PRACH signal data from resource elements provided in a resource grid of the subcarrier spacing of the one or more other channels;
mapping the recovered down-sampled PRACH signal data to down-sampled PRACH requisite samples; and
processing the down-sampled PRACH requisite samples and providing frequency domain PRACH symbols based on the subcarrier spacing of the PRACH.

2. The method of claim 1, further comprising:
extracting resource blocks of the frequency domain symbols overlapping with a PRACH sequence of the PRACH signal to provide the resource elements used in performing the frequency domain filtering.

3. The method of claim 1, wherein the processing the uplink signal comprises:
transforming the uplink signal from time domain to frequency domain to provide the frequency domain symbols.

4. The method of claim 3, wherein the transforming the uplink signal comprises:
performing a fast Fourier transform of the uplink signal.

5. The method of claim 1, wherein the processing the uplink signal comprises:
performing cyclic prefix (CP) removal with respect to the uplink signal based on the subcarrier spacing of the one or more other channels and CP type.

6. The method of claim 1, wherein the performing frequency domain filtering comprises:
computing inverse discrete Fourier transform (IDFT) with down-sampling using sample indices within orthogonal frequency division multiplexing (OFDM) symbols that are based on the subcarrier spacing of the one or more other channels to provide the down-sampled PRACH signal data.

7. The method of claim 6, further comprising:
determining sample indices for each OFDM symbol of the OFDM symbols that a PRACH sequence of the PRACH signal occupies to generate the sample indices within the OFDM symbols.

8. The method of claim 7, wherein the determining sample indices for each OFDM symbol comprises:
calculating a first sample index for each OFDM symbol that the PRACH sequence occupies; and
calculating a plurality of sample indices within each OFDM symbol that the PRACH sequence occupies based upon the first sample index for a respective OFDM symbol and a down-sampling rate.

9. The method of claim 6, wherein the sample indices within the OFDM symbols are calculated offline with respect to the performing frequency domain filtering.

10. The method of claim 6, wherein the sample indices within the OFDM symbols are calculated using a format of the PRACH, a down-sampling rate, and a numerology of the one or more other channels in the uplink signal.

11. The method of claim 6, wherein IDFT coefficients used in the computing IDFT with down-sampling are calculated offline with respect to the performing frequency domain filtering.

12. The method of claim 1, wherein the mapping the recovered down-sampled PRACH signal data to down-sampled PRACH requisite samples comprises:
using requisite sample indices comprising index start and index end indices for each orthogonal frequency division multiplexing (OFDM) symbol overlapping a PRACH sequence of the PRACH signal.

13. The method of claim 12, wherein the sample indices within the OFDM symbols are calculated offline with respect to the performing frequency domain filtering.

14. The method of claim 1, wherein a length of the down-sampled PRACH requisite samples is based on a IDFT size (N) and a down-sampling rate (M).

15. The method of claim 1, wherein the processing the down-sampled PRACH requisite samples comprises:
performing a fast Fourier transform of the down-sampled PRACH requisite samples to transform the down-sampled PRACH requisite samples to frequency domain, wherein the transforming provides the frequency domain symbols based on the subcarrier spacing of the PRACH.

16. A frequency domain physical random access channel (PRACH) filter for PRACH signal recovery, wherein the PRACH signal is received in an uplink signal multiplexed with one or more other channels having a different subcarrier spacing than a subcarrier spacing of the PRACH, the method comprising:
indices for PRACH recovery, wherein the indices for PRACH recovery comprise sample indices within orthogonal frequency division multiplexing (OFDM) symbols and requisite sample indices;
an inverse discrete Fourier transform (IDFT) with down-sampling circuit configured to compute down-sampled PRACH signal data from frequency domain symbols using the sample indices within the OFDM symbols for a format of a PRACH sequence of the PRACH signal; and
an OFDM symbol mapping circuit configured to map the PRACH signal data to PRACH requisite samples using the requisite sample indices for the format of the PRACH sequence.

17. The frequency domain PRACH filter of claim 16, further comprising:
an indices for PRACH recovery determining circuit having logic configured to generate the indices for PRACH recovery.

18. The frequency domain PRACH filter of claim 17, wherein the indices for PRACH recovery determining circuit has logic configured to determine sample indices for each OFDM symbol of the OFDM symbols that a PRACH sequence of the PRACH signal occupies to generate the sample indices within the OFDM symbols.

19. The frequency domain PRACH filter of claim 18, wherein the logic configured to determine sample indices for each OFDM symbol of the OFDM symbols that the PRACH sequence occupies comprises logic configured to calculate an index for a first sample within an OFDM symbol of the OFDM symbols and to calculate indices within the OFDM symbol of the OFDM symbols for a plurality of samples using the index for the first sample and a down-sampling rate.

20. The frequency domain PRACH filter of claim 16, further comprising:
a database of the indices for PRACH recovery, wherein the indices for PRACH recovery are calculated offline with respect to performing frequency domain filtering by the frequency domain PRACH filter.

21. The frequency domain PRACH filter of claim 16, further comprising:
a database of IDFT coefficients, wherein at least a portion of the IDFT coefficients are used by the IDFT with down-sampling circuit in computing the down-sampled PRACH requisite samples, and wherein the IDFT coefficients are calculated offline with respect to performing frequency domain filtering by the frequency domain PRACH filter.

22. The frequency domain PRACH filter of claim 16, wherein the frequency domain PRACH filter is disposed in an uplink receiver block of a 3GPP LTE receiver.

23. The frequency domain PRACH filter of claim 16, wherein the frequency domain PRACH filter is disposed in an uplink receiver block of a 3GPP NR receiver.

24. A method for physical random access channel (PRACH) signal recovery, wherein the PRACH signal is received in an uplink signal multiplexed with one or more other channels having a different subcarrier spacing than a subcarrier spacing of the PRACH, the method comprising:
performing cyclic prefix (CP) removal with respect to the uplink signal;
performing, subsequent to the CP removal, a fast Fourier transform of the uplink signal transforming the uplink signal from time domain to frequency domain and providing frequency domain symbols that are based on the subcarrier spacing of the one or more other channels;
extracting resource blocks of the frequency domain symbols overlapping with a PRACH sequence of the PRACH signal to provide resource elements used in performing frequency domain filtering;
performing frequency domain filtering of the resource elements extracted from the frequency domain symbols using indices for PRACH recovery and providing down-sampled PRACH requisite samples, wherein the frequency domain filtering comprises:
computing inverse discrete Fourier transform (IDFT) with down-sampling using sample indices within orthogonal frequency division multiplexing (OFDM) symbols that are based on the subcarrier spacing of the one or more other channels to provide the down-sampled PRACH requisite samples to recover down-sampled PRACH signal data; and
mapping the recovered down-sampled PRACH signal data to the down-sampled PRACH requisite samples; and
performing a fast Fourier transform of the down-sampled PRACH requisite samples and providing frequency domain PRACH symbols based on the subcarrier spacing of the PRACH.

25. The method of claim 24, wherein indices of the indices for PRACH recovery are calculated using a format of the PRACH, a down-sampling rate, and a numerology of the one or more other channels in the uplink signal.

26. The method of claim 25, further comprising:
determining sample indices for each OFDM symbol of the OFDM symbols that the PRACH sequence of the PRACH signal occupies to generate the sample indices within the OFDM symbols, wherein the indices for PRACH recovery comprise the sample indices within the OFDM symbols.

27. The method of claim 26, wherein the determining sample indices comprises:
finding, for each PRACH sequence, a first and a last OFDM symbol indices that a PRACH sequence occupies.

28. The method of claim 27, wherein the determining sample indices for each OFDM symbol comprises:
calculating a first sample index for each OFDM symbol that the PRACH sequence occupies; and
calculating a plurality of sample indices within each OFDM symbol that the PRACH sequence occupies based upon the first sample index for a respective OFDM symbol and a down-sampling rate.

29. The method of claim 24, wherein the mapping the recovered down-sampled PRACH signal data to the down-sampled PRACH requisite samples comprises:
using requisite sample indices comprising index start and index end indices for each OFDM symbol overlapping a PRACH sequence of the PRACH signal, wherein the indices for PRACH recovery comprise the requisite sample indices.

30. The method of claim 24, wherein indices of the indices for PRACH recovery are calculated offline with respect to the performing frequency domain filtering.

31. The method of claim 24, wherein IDFT coefficients used in the computing IDFT with down-sampling are calculated offline with respect to the performing frequency domain filtering.

32. The method of claim 24, wherein a length of the down-sampled PRACH requisite samples is based on a IDFT size (N) and a down-sampling rate (M).

* * * * *